(12) United States Patent
Kuhlmann

(10) Patent No.: US 9,115,534 B2
(45) Date of Patent: Aug. 25, 2015

(54) MOUNTING FOR A SIDE PANEL OF A WEIGHING MACHINE, ASSEMBLY FOR A WINDSHIELD OF A WEIGHING MACHINE, AND METHOD FOR REMOVING A SIDE PANEL OF SUCH AN ASSEMBLY

(71) Applicant: Sartorius Lab Instruments GmbH & Co. KG, Goettingen (DE)

(72) Inventor: Otto Kuhlmann, Goettingen (DE)

(73) Assignee: Sartorius Lab Instruments GmbH & Co. KG, Goettingen (DE)

(*) Notice: Subject to any disclaimer, the term of this patent is extended or adjusted under 35 U.S.C. 154(b) by 0 days.

(21) Appl. No.: 14/304,883

(22) Filed: Jun. 14, 2014

(65) Prior Publication Data

US 2014/0290140 A1 Oct. 2, 2014

Related U.S. Application Data

(63) Continuation of application No. PCT/EP2012/004588, filed on Nov. 3, 2012.

(30) Foreign Application Priority Data

Dec. 14, 2011 (DE) .......................... 10 2011 056 400

(51) Int. Cl.
*G01G 21/28* (2006.01)
*E06B 3/46* (2006.01)

(52) U.S. Cl.
CPC ............... *E06B 3/46* (2013.01); *G01G 21/286* (2013.01)

(58) Field of Classification Search
CPC ............................... E06B 3/46; G01G 21/286

USPC ................................ 177/180, 181; 312/139.2
See application file for complete search history.

(56) References Cited

U.S. PATENT DOCUMENTS 3,389,943 A * 6/1968 Jones et al. ................. 312/139.2
4,664,207 A * 5/1987 Knothe et al. ................ 177/181
4,700,793 A * 10/1987 Luchinger .................... 177/181

(Continued)

FOREIGN PATENT DOCUMENTS

DE 9407984 U1 7/1994
DE 102008008486 A1 8/2009

(Continued)

OTHER PUBLICATIONS

International Search Report in counterpart International Application No. PCT/EP2012/004588, mailed Apr. 8, 2013.

*Primary Examiner* — Katherine Mitchell
*Assistant Examiner* — Justin Rephann
(74) *Attorney, Agent, or Firm* — Edell, Shapiro & Finnan, LLC

(57) ABSTRACT

A mounting (28) for a side panel (26) of a weighing machine (10) has two rails (30, 32) which lie opposite one another and extend substantially parallel to each other. The side panel (26) is guided between the rails and thereby moves between a closed position and an open position. A stop (46) on the first rail (30) co-operates with the side panel (26), such that the completely open position is defined, and the second opposite rail (32) lies opposite the first rail (30) with such a spacing that the side panel (26), when being located in the open position, can be moved away by lifting of the rear edge (29) of the side panel (26) over the stop (46), but the opposing front edge (27) of the side panel (26) cannot be lifted or can only be lifted insignificantly.

21 Claims, 8 Drawing Sheets

(56) References Cited

U.S. PATENT DOCUMENTS

| | | | |
|---|---|---|---|
| 4,716,693 A * | 1/1988 | Webster | 52/64 |
| 4,798,250 A * | 1/1989 | Knothe et al. | 177/181 |
| 5,074,369 A * | 12/1991 | Strickler | 177/180 |
| 5,165,142 A * | 11/1992 | Pilsbury | 16/90 |
| 5,170,855 A * | 12/1992 | Kunz et al. | 177/181 |
| 5,264,667 A * | 11/1993 | Luechinger et al. | 177/180 |
| 5,285,021 A * | 2/1994 | Luechinger | 177/181 |
| 5,298,688 A * | 3/1994 | Luechinger et al. | 177/181 |
| 5,461,829 A * | 10/1995 | Lehto et al. | 49/409 |
| 5,874,694 A * | 2/1999 | Ruedisueli | 177/180 |
| 6,003,201 A * | 12/1999 | Ryczek | 16/87 R |
| 6,504,112 B1 | 1/2003 | Luebke et al. | 177/180 |
| 6,566,614 B1 * | 5/2003 | Fluckiger et al. | 177/180 |
| 6,686,545 B2 * | 2/2004 | Luchinger et al. | 177/180 |
| 6,844,507 B2 * | 1/2005 | Leisinger et al. | 177/180 |
| 6,909,057 B2 * | 6/2005 | Aebi et al. | 177/180 |
| 6,998,544 B2 * | 2/2006 | Nomura | 177/181 |
| 7,145,086 B2 * | 12/2006 | Iiduka et al. | 177/180 |
| 7,193,164 B2 * | 3/2007 | Olesen et al. | 177/180 |
| 7,531,759 B2 * | 5/2009 | Luchinger et al. | 177/180 |
| 8,198,553 B2 * | 6/2012 | Durst et al. | 177/180 |
| 8,789,312 B2 * | 7/2014 | Landerer | 49/41 |
| 2004/0079558 A1 | 4/2004 | Luchinger et al. | |
| 2007/0012488 A1* | 1/2007 | Olesen et al. | 177/180 |
| 2009/0020341 A1* | 1/2009 | Hamamoto et al. | 177/180 |
| 2009/0194340 A1* | 8/2009 | Mock | 177/180 |
| 2010/0095598 A1 | 4/2010 | Izumo et al. | 49/404 |
| 2010/0276213 A1* | 11/2010 | Zeiss et al. | 177/180 |
| 2010/0288566 A1* | 11/2010 | Luchinger et al. | 177/180 |
| 2010/0326743 A1 | 12/2010 | Duerst et al. | |
| 2012/0111646 A1* | 5/2012 | Schillig | 177/181 |
| 2014/0014416 A1* | 1/2014 | Feldotte et al. | 177/181 |

FOREIGN PATENT DOCUMENTS

| | | |
|---|---|---|
| EP | 1195585 A1 | 4/2002 |
| GB | 2217584 A | 11/1989 |

* cited by examiner

MOUNTING FOR A SIDE PANEL OF A WEIGHING MACHINE, ASSEMBLY FOR A WINDSHIELD OF A WEIGHING MACHINE, AND METHOD FOR REMOVING A SIDE PANEL OF SUCH AN ASSEMBLY

CROSS-REFERENCE TO RELATED APPLICATIONS

This is a Continuation of International Application PCT/EP2012/004588, with an international filing date of Nov. 3, 2012, which was published under PCT Article 21(2) in German, and the complete disclosure of which, including amendments, is incorporated into this application by reference.

FIELD OF AND BACKGROUND OF THE INVENTION

The invention relates to a mounting for a side panel of a weighing machine having two rails which lie opposite one another and extend substantially parallel to one another, between which the side panel is guided in such a manner that the side panel can be displaced between a closed position and an open position. The invention also relates to an assembly for a windshield of a weighing machine, and a method for removing a side panel of such an assembly.

It is commonly known to mount a windshield on a precision weighing machine, the windshield surrounding a space above the scale pan of the weighing machine. Examples of a windshield of this type are disclosed by DE 94 07 984 U and EP 1 195 585 A1. With regard to the basic function thereof, that is, preventing the influencing of the weighing process by air movements, electrostatic attractive forces or thermal radiation, the embodiments of a windshield that are known from the prior art are satisfactory. In order to be able to place an object to be weighed on the scale pan, a windshield of this type has a side panel which can be displaced between a closed position and an open position. In order to clean the windshield or to gain unhindered access to the scale pan, it is desirable to be able to remove this side panel completely. At the same time, the side panel must be safely guided and held in the mounting in order to prevent unintentional sliding out of the side panel, for example, during too rapid displacement into the open position.

OBJECTS OF THE INVENTION

It is an object of the invention to provide a mounting for a side panel which enables simple removal of the side panel, but enables safe guidance and prevents unintended falling out of the side panel. It is a further object of the invention to provide a method for removing a side panel of this type.

SUMMARY OF THE INVENTION

In order to address this object, with a mounting of the aforementioned type, according to one aspect of the invention, a stop is provided at the first rail. This stop co-operates with the side panel such that the completely open position is defined and the second, opposite rail lies opposing the first rail at such a spacing that the panel, when located in the open position can be moved beyond the stop by lifting the edge of the panel which is at the rear during opening of the side panel, whilst however, the opposing front edge of the panel can be lifted not at all or only insignificantly. If the side panel were pushed open too rapidly, it would collide with the stop and then tilt backwardly around the stop, so that the front edge of the side panel would lift. This is reliably prevented by the form of the second rail which in this position permits lifting of the front edge not at all or only insignificantly. On the one hand, the second rail is configured such that the rear edge can be raised and the side panel can be moved beyond the stop. For removal of the side panel, the panel must be actively lifted, but no additional securing elements must be released. The side panel can be removed simply, without any tools. At the same time, the panel is reliably protected against being accidentally pushed out of the rail.

Preferably, a closing mechanism which fixes the side door in the closed position, or moves the side door into this position is additionally provided at the side door. Unintended opening or incomplete closing of the side door is thereby reliably precluded so that a precise weighing process is possible independently of external influences.

The closing mechanism is preferably based on changes of mechanical potential, that is, on the side panel being lowered into the closed position by gravity. This enables independent closing of the side panel without additional components.

In an embodiment of this type, the closing mechanism has at least one section on one of the rails extending inclined, in particular on the lower lying rail. The side panel is moved forwardly along this rail so that the side panel is automatically moved forwardly into the closed position due to gravity.

The inclined section lies, for example, at the front and/or rear end of the rail in the closing direction.

The rail preferably has a dead point beyond which the side panel must be moved before the closing mechanism can act upon the side panel. In this embodiment, the closing mechanism does not act constantly on the side panel, but only after passing the dead point, so that the side panel can also be held in an opened position. The dead point can, for example, be formed in that the rail has two sections which decline in opposing directions, forming the dead point between these two sections. The sections which decline can be configured such that the front and rear edges of the side panel lie in the closed and/or open position at the same height, that is, the side panel is oriented horizontally.

The second rail preferably extends, from a point lying opposite the stop in the opening direction, away from the first rail. As a result, in the rear region, particularly in the region of the stop, the second rail has a greater distance from the first rail, so that the side panel can be lifted with the rear edge thereof whilst the second rail extends in a front section such that the front edge of the side panel cannot be lifted. Since the side panel can be tilted about the stop or about the projection which lies against the stop, it must be ensured that the front, upper edge of the side panel makes contact with the second rail. Since, when the side panel is tilted, this corner moves essentially along a circular arc about the stop or the projection, in order to reliably prevent tilting of the side panel, the second section must be arranged within a circular arc, the center point of which is the stop or the projection and the radius of which corresponds to the distance from the center point to the front upper corner of the side panel.

Preferably, the first and/or second rail is/are formed by a groove. This enables lateral guidance of the side panel, including in a region in which the second rail extends away from the first rail. The grooves must only be configured sufficiently deep such that the side panel is securely laterally guided in the grooves even when the side panel is lifted.

The stop at the first rail is preferably formed, for example, by a narrowing of the groove. This has the advantage, as compared with a conventional horizontal step, that the base of the rail extends evenly and does not have any horizontal steps.

This substantially simplifies the cleaning of the rail because no steps are present against which dirt can collect.

In order to further simplify cleaning, the rails are open in the displacement direction so that dirt can easily be removed from the rail.

The side panel can be inserted directly into the rails. Preferably, however, a retaining strip is provided in each rail, mounted in the rail so as to be displaceable in the closing direction, wherein the side panel can be attached to the retaining strip. With this additional retaining strip, the panel can be mounted with substantially less friction. In addition, projections which can cooperate with the stop in order to define the open position can be more simply configured on a retaining strip of this type. The retaining strips also constitute a protection for the edges of the side panel.

A projection which is able to cooperate with the stop is preferably provided at the retaining strip mounted in the first rail. The opened position or the opening possibilities of the side panel are defined by the position of the stop or of the projection.

The projection preferably lies behind the center of gravity axis of the panel in the closing direction. This prevents the side panel tilting backwardly about its center of gravity axis in the position in which it rests against the stop. Even if, due to the form of the second rail, the side panel cannot tilt out of the mounting, through tilting of the side panel backwardly, the front edge of the side panel could make contact with the second rail, which could lead to damaging of the side panel or to jamming of the side panel in the mounting. Since the projection lies behind the center of gravity axis, this is reliably prevented.

The retaining strip guided in the first rail preferably has three support points, wherein a first support point is provided at the front end of the retaining strip in the closing direction, a second support point is provided at the rear end of the retaining strip in the closing direction and a third support point is provided in the region of the projection, the third support point being provided, in particular, in front of the projection in the closing direction. Typically, the side panel or the retaining strip is mounted on the first and second support points. The third, central support point serves as an additional mounting when the second support point is pushed rearwardly out of the rail during opening of the side panel. In this way, a mounting on at least two support points is ensured in each position, so that tilting of the side panel is reliably prevented.

The first, second and/or third support point are provided, for example, by a roller, wherein the side panel is mounted with very low friction.

However, it is conceivable for the support points to be provided by a skid so that no rotating parts, which would necessitate an increased maintenance workload, are present.

The third support point is arranged opposing the first and the second support point offset in height from the first rail on the retaining strip. This means that the retaining strip is typically mounted on the first and second support points. The third, central support point serves purely for additional mounting during opening of the side panel.

A handle is preferably provided at the front edge of the retaining strip for opening and closing the side panel.

According to a further aspect of the invention, an assembly is also provided for a windshield of a weighing machine, having a mounting according to the invention and a side panel which is mounted in the rails so as to be displaceable between a closed position and an opened position.

Further according to the invention, a method for removing a side panel from an assembly of this type is provided, comprising:
 displacing the side panel against the closing direction until the projection associated with the side panel lies against the stop of the first rail,
 lifting the rear edge of the side panel until the projection no longer lies against the stop, wherein the side panel is pivoted about the front support point,
 displacing the side panel against the closing direction until the side panel is completely pushed out of the mounting. [Independent claim paraphrased] . . . .

These and other features of preferred embodiments of the invention are described in the claims as well as in the specification and the drawings. The individual features may be implemented either alone or in combination as embodiments of the invention, or may be implemented in other fields of application. Further, they may represent advantageous embodiments that are protectable in their own right, for which protection is claimed in the application as filed or for which protection will be claimed during pendency of this application and/or continuing applications.

BRIEF DESCRIPTION OF THE DRAWINGS

The invention as well as embodiments and advantages thereof are described below in greater detail, by way of example, with reference to the drawings in which.

DETAILED DESCRIPTION OF PREFERRED EMBODIMENTS

Figure 1:
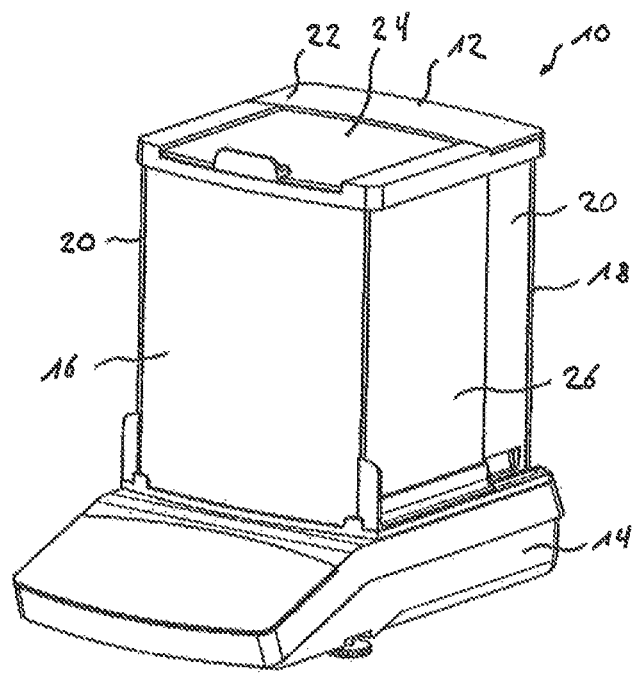
FIG. 1 is a weighing machine with an assembly according to the invention for a windshield.
Figure 2:
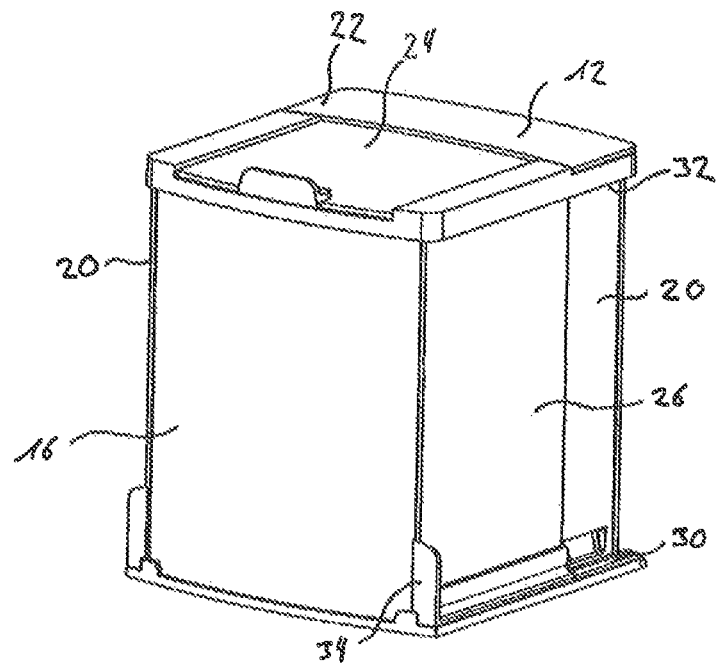
FIG. 2 is the windshield of the weighing machine of FIG. 1.

FIG. 1 shows a precision weighing machine 10 with a weighing device 14 and a windshield 12. The windshield 12 serves to surround a space above the weighing device 14 and thus to protect the scale pan of the weighing device 14 against external influences, for example, air movements, electrostatic attractive forces or heat radiation, in order to ensure an accurate measurement.

The windshield 12 has a front side 16, a rear side 18, two side walls 20 and a top cover 22. The windshield 12 is configured open downwardly toward the weighing device 14, although the windshield can have a base plate or a frame on which the front side 16, the rear side 18 and the side walls 20 are held or mounted. In order to be able to place an object to be weighed into the windshield 12 and onto the scale pan, firstly, a cover slide 24 is provided on the top cover 22. Secondly, the side walls 20 each have a displaceable side panel 26 (see FIG. 3).

Figure 4:
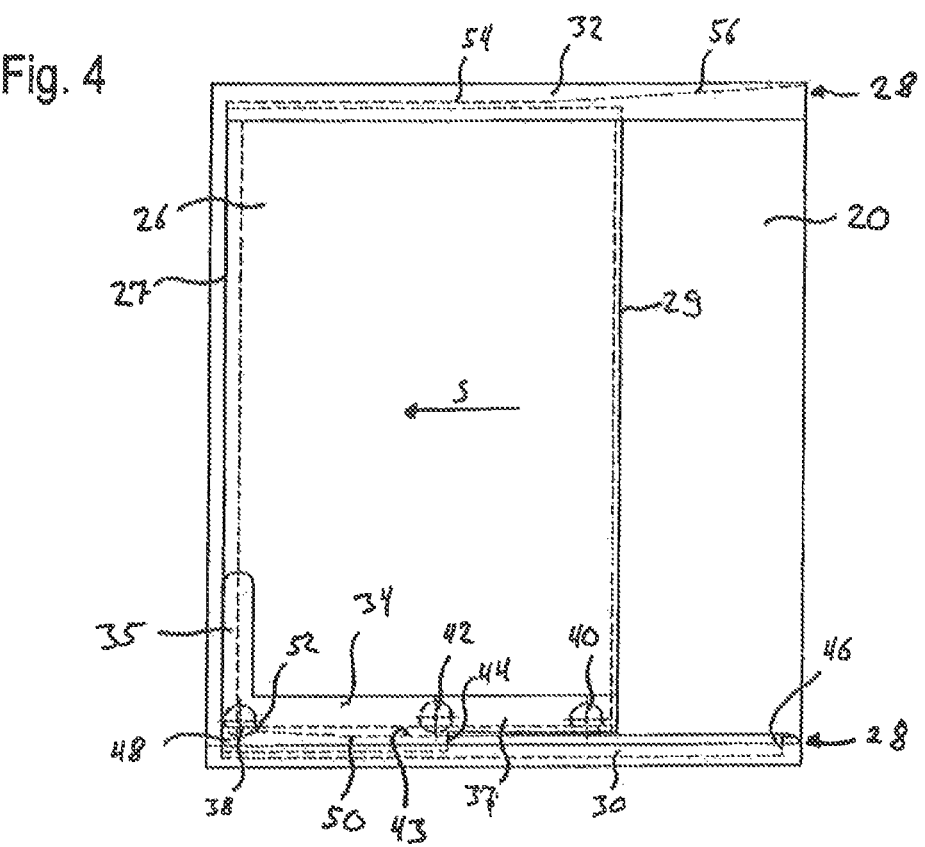
FIG. 4 is a side view of an assembly according to the invention for a windshield.

As FIG. 4 shows, a mounting 28 for the side panel 26 which comprises a first rail 30 and a second rail 32 is provided at each side wall 20. The mounting 28 also has retaining strips on which the side panel is fastened and is mounted in the rails with low friction. In the embodiment shown here, only the retaining strip 34 associated with the first rail 30 is shown in detail. A retaining strip can also be associated with the second rail 32. For reasons of clarity, this is not shown in the present drawings.

The rails 30, 32 are arranged opposing one another and extend substantially parallel to one another and in a plane arranged substantially parallel to the side wall 20. The side panel 26 is displaceable in the mounting 28 between a closed position shown in FIG. 4 and an opened position (FIG. 5d) in which part of the side wall 20 is made rendered free.

The first rail 30 has a stop 46 at the rear end thereof and two inclined sections 48, 50, wherein between these sections 48, 50, a dead point 52 is formed. The first inclined section 48 declines toward the front end of the first rail 30 and the second inclined section 50 declines toward the rear end of the first rail, wherein the slope of the first inclined section 48 is substantially steeper than the slope of the second inclined section 50. The first inclined section 48 has a slope of between 10° and 20°. The slope of the second inclined section 50 is between >0° and a maximum of 5°.

The second rail 32 extends in a first, front section 54 substantially parallel to the first rail 30. In a second, rear section 56, the second rail 32 extends away from the first rail 30.

The retaining strip 34 is configured substantially L shaped and has a handle 36 at a first limb 35, which serves for displacing the side panel 26 between the closed position and the open position. At the second limb 37 of the retaining strip 34, three support points 38, 40, 42 are provided, by which the retaining strip 34 is mounted in the first rail 30. The support points 38, 40, 42 each have a roller which is rotatably mounted on the retaining strip 34. It is also feasible, however, that the support points are formed by skids.

The first support point 38 lies at the front edge of the side panel 26, the second support point 40 is located at the rear edge of the side panel. The third support point 42 is arranged between these support points 38, 40, as FIG. 4 shows, set back relative to the first and second support points 38, 40 in relation to the first rail 30, so that in the closed position, this support point does not lie on the base 43 of the first rail 30. Furthermore, the third support point 42 is arranged behind the center of gravity axis of the side panel 26 or behind the assembly consisting of the side panel 26 and the retaining strip 34. A projection 44 is also provided on the retaining strip 34 and, as described below, the projection is configured to cooperate with a stop 46 which is formed at the rear end of the first rail 30 and defines the fully open position of the side panel 26.

In regular operation, that is, when the side panel 26 is displaced between the closed and the open position, the side panel 26 is mounted with only the first support point 38 and the second support point 40 in the first rail 30.

The first inclined section 48 serves herein as a closing mechanism. If the support points 38, 40, 42 are situated on one of the inclined sections 48, 50, a normal force acts perpendicularly to each of these inclined sections 48, 50, as well as a downhill driving force acting parallel to these sections 48, 50.

If the side panel 26 is moved from the open position into the closed position, a downhill driving force acts upon the first support point 38, as soon as this support point is moved beyond the dead point 52, due to the steeper slope of the first inclined section, which moves the first support point 38 forwardly and thus moves the side panel 26 into the closed position. For this purpose, the slope of the first inclined section is selected so that the downhill driving force acting on the first support point 38 is greater than the frictional force of all the support points 38, 40, 42 and the downhill driving force acting on the second and third support points 40, 42, so that the side panel is moved forwardly by the resultant force on the side panel 26 into the closed position.

The downhill driving force acting on the support points 38, 40, 42 and therefore on the side panel 26 after displacement of the first support point 38 beyond the dead point 52 onto the second section 50 is significantly smaller due to the small slope of the second inclined section 50. Depending on the slope and the type of support points 38, 40, 42, this force can be sufficiently large in order to move the side panel 26 into the open position. However, it is also conceivable that the slope is selected so that thereby only the additional force needed to displace the side panel 26 into the open position is reduced and thus the side panel 26 can be moved by the application of a small force.

The second inclined section 50 therefore serves herein firstly to support the opening of the side panel 26 after overcoming the dead point 52, that is, the displacement into the open position. In addition, this serves to ensure a height equalization to the first inclined section 48, so that the side panel 26 is oriented substantially horizontally in the closed position. This is achieved in that the slope of the first and second inclined sections 48, 50 are selected such that, in the closed position, the first and second support points 38, 40 lie at substantially the same height.

The movement of the side panel 26 into the open position and the removal of the side panel 26 is shown in FIGS. 5a to 5h.

Figure 5A:
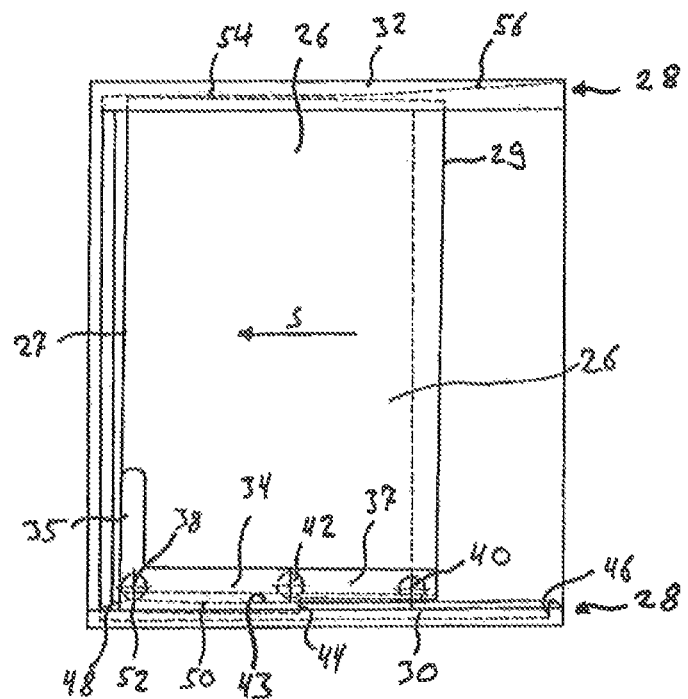
FIGS. 5A to 5H are different method steps for removing the side panel of the assembly of FIG. 4.
Figure 5B:
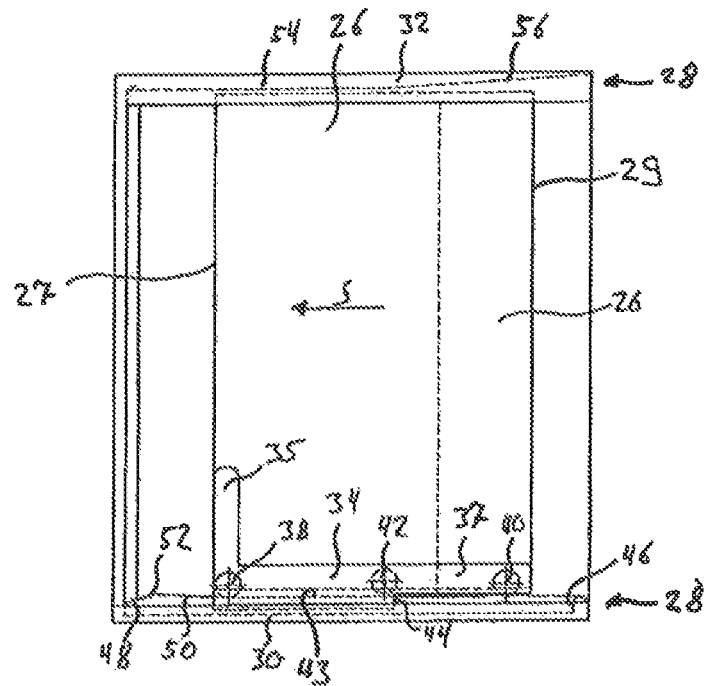
Figure 5C:
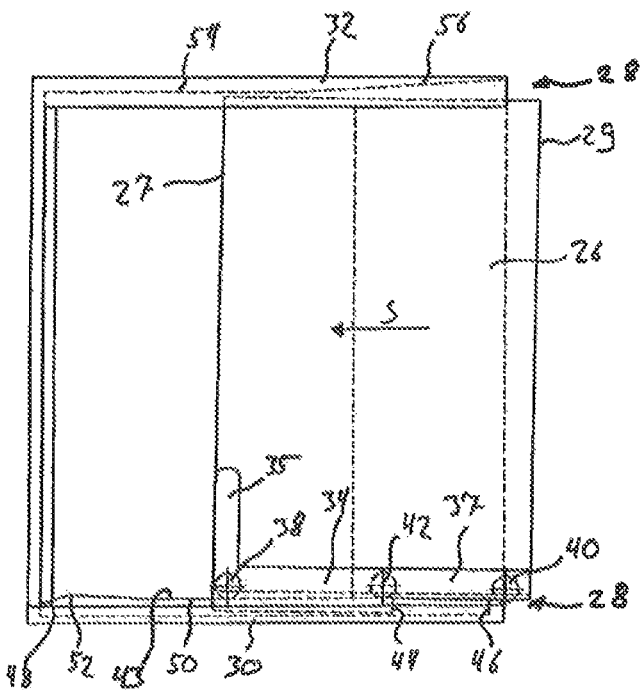
Figure 5D:
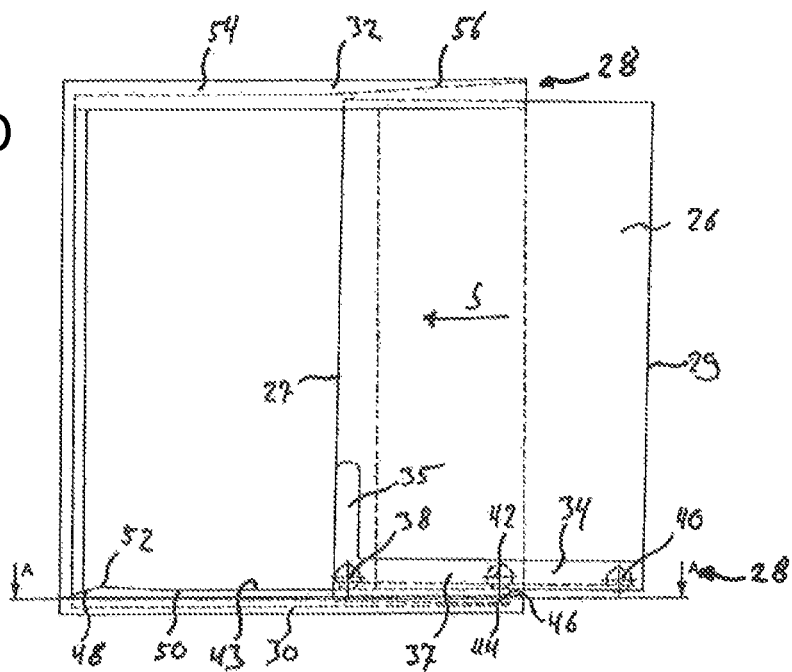

FIG. 4 shows the side panel in the completely closed position. For opening the side panel 26, the panel is displaced against a closing direction S until the first support point 38 is moved beyond the dead point 52 (FIG. 5A). When the dead point 52 is reached, the side panel 26 is displaced by the first inclined section 48 into the closed position. Once the dead point 52 has been passed, the side panel 26 is displaced further against the closing direction S until the projection 44 lies against the stop 46 (FIGS. 5B to 5D).

Once the second support point 40 has been pushed rearwardly out of the first rail 30 (FIG. 5C), the panel lies on the first support point 38 and the third, middle support point 42, wherein the side panel is easily tilted rearwardly, since the third support point 42 is arranged offset. The rear end of the first rail 30 is rounded so that the second support point 40 is lowered gently. In addition, when the side panel 26 is moved into the closed position, the rounded end serves as a ramp for the second support point 40, which is pushed out of the first rail 30.

Figure 5E:
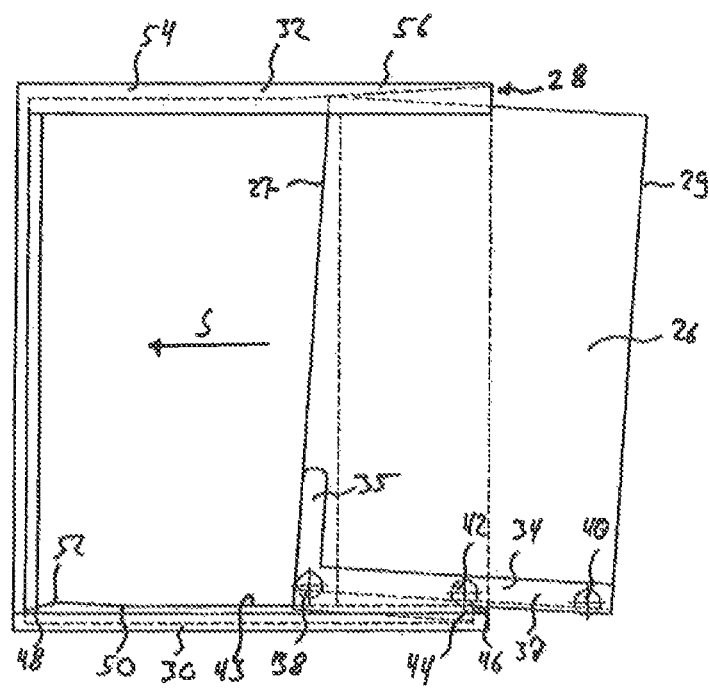

As can be seen from FIG. 5E, in this opened position, the front edge 27 of the side panel 26 can only be lifted so far until the front edge 27 makes contact with the second rail 32. Accidental lifting out or falling out of the side panel 26 in the event that the side panel 26 is pushed at a high speed against the stop 46 and is consequently tilted about the stop 46 is therefore not possible.

During displacement into the open position, the second support point 40 is pushed out of the first rail 30. As FIGS. 5C and 5D show, the side panel then rests upon the first and third support points 38, 42. Tilting of the side panel 26 about the third, central support point 42, however, is reliably prevented since this support point is arranged behind the center of gravity axis of the side panel 26 in the closing direction S. The projection 44 is also arranged behind the center of gravity axis of the side panel 26 in the closing direction S, in order to prevent tilting of the side panel 26 when the projection 44 lies against the stop 46.

Figure 5F:
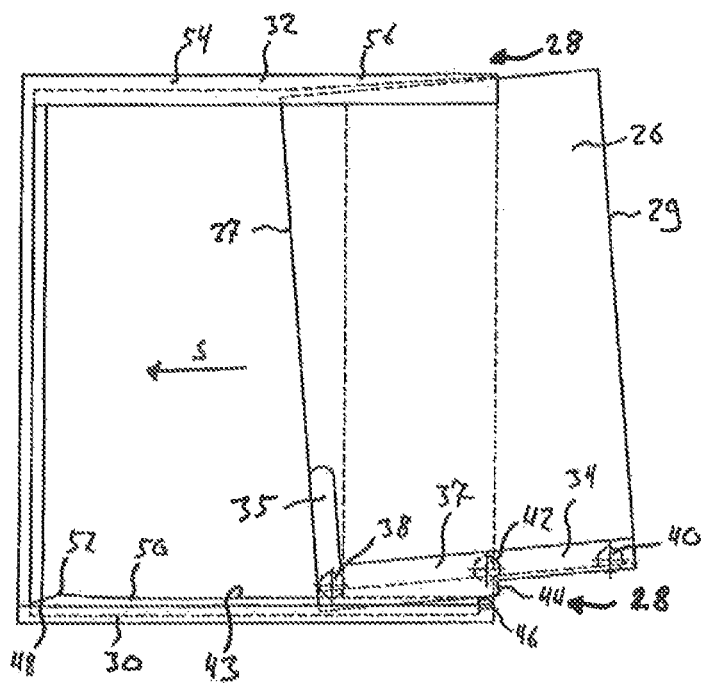
Figure 5G:
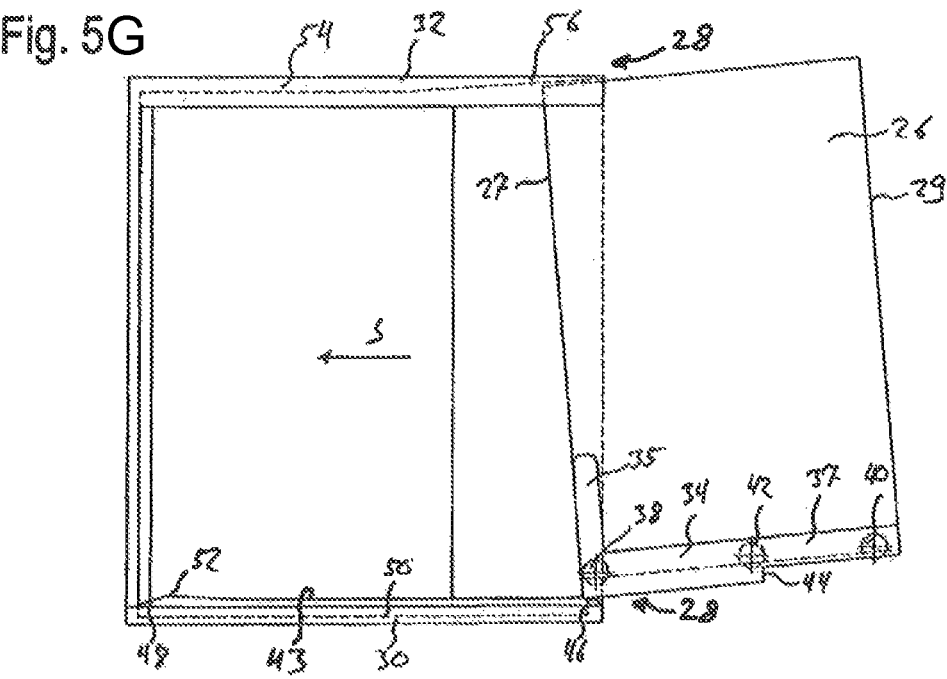
Figure 5H:
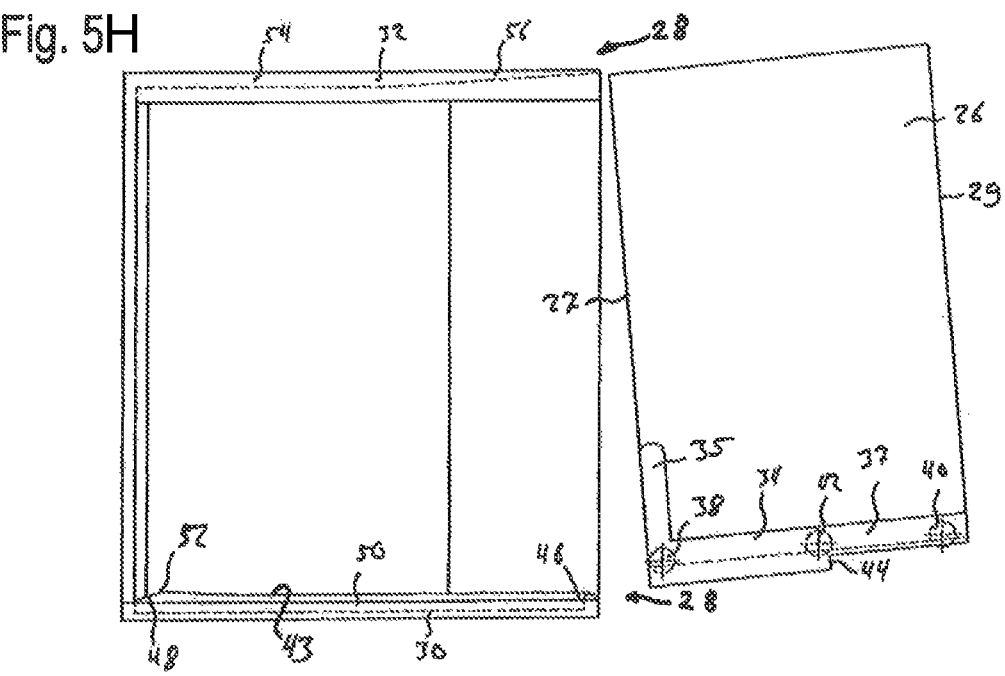

In order to remove the side panel 26, the rear edge 29 of the side panel 26 must be lifted until the projection 44 no longer lies against the stop 46. As FIG. 5F shows, the second, rear section 56 of the second rail 32 is configured, since this section extends away from the first rail 30, such that lifting of the rear edge 29 is possible without the side panel 26 making contact with the second rail 32. The side panel can subsequently be pushed out of the mounting 28 against the closing direction S (FIGS. 5G and 5H). The side panel 26 is herein mounted with the first support point 38 in the rail 30 such that simple friction-free displacement of the side panel 26 is possible.

Figure 6:
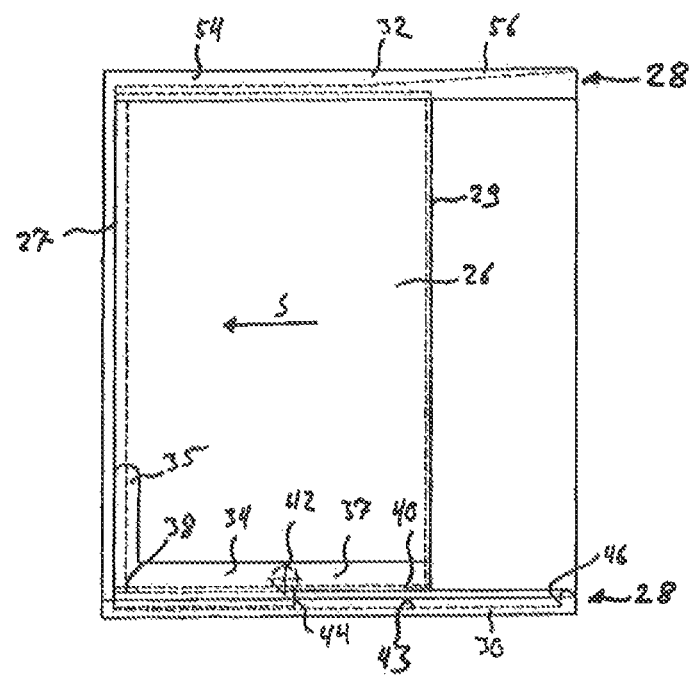
FIG. 6 is a second embodiment of an assembly according to the invention.
Figure 7A:
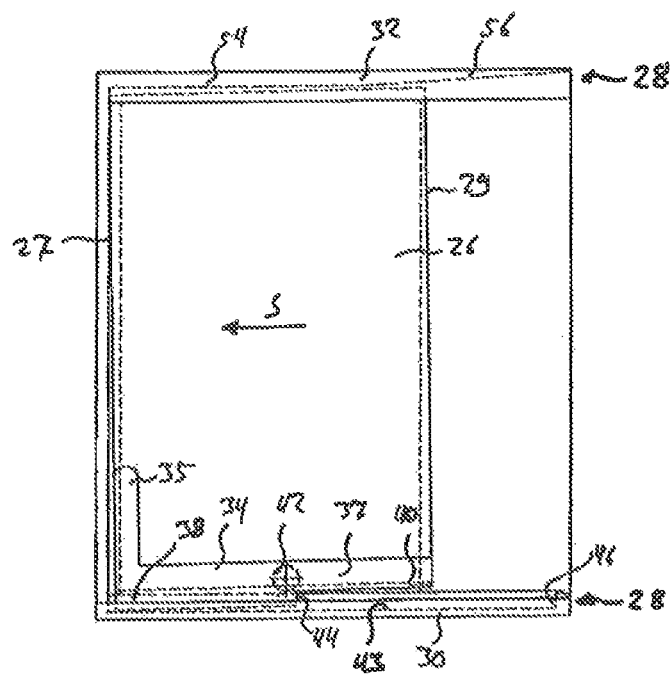
FIGS. 7A to 7C are different method steps for removing the side panel of the assembly of FIG. 6.
Figure 7B:
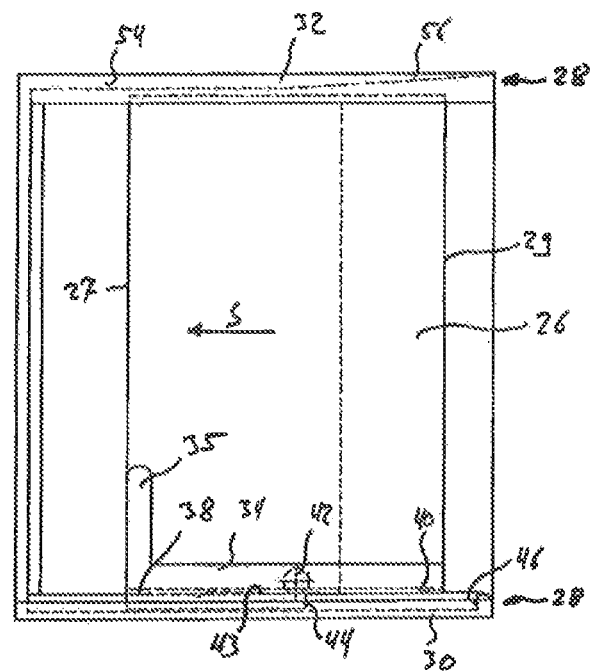
Figure 7C:
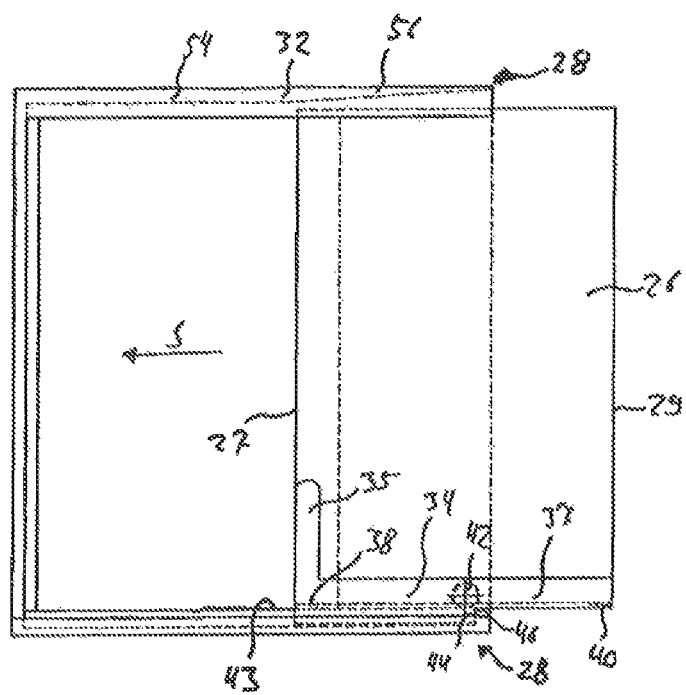

A second embodiment of an assembly according to the invention is shown in FIG. 6. The construction of this assembly substantially matches that of the assembly shown in FIG. 4. The first and second support points 38, 40 of the retaining strip 34 are constituted in this case by slide bearings, whilst the third support point 42 is again provided by a roller. Furthermore, the first rail 30 has no inclined sections, but is configured substantially horizontal. As shown in FIGS. 7A to 7C, the side panel 26 of this assembly can also be removed from the mounting 28 in the same manner as in the embodiment of FIG. 4.

Figure 3:
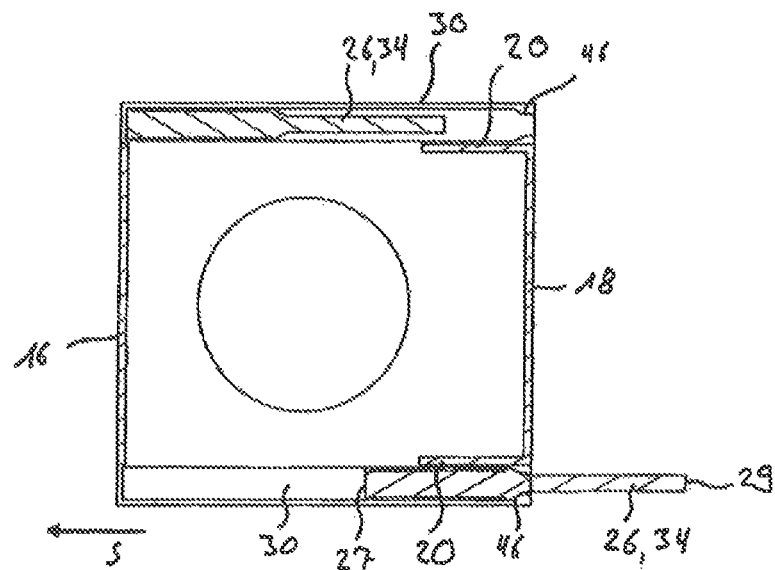
FIG. 3 is a sectional view through the windshield of FIG. 2.

As shown in FIG. 3, the rails 30, 32 are each constituted by a groove which is configured open at the rear. This has the advantage that dirt which builds up in the rail 30, 32 can be pushed out of the respective rail 30, 32 especially simply. The stop 46 is also constituted by a narrowing, whereas the projection 44 is provided by an extension at the retaining strip 34. In this way, the base 43 of the rail 30, 32 does not have any steps against which dirt could collect.

The second section 56 of the second rail 32 is configured, as shown particularly in FIG. 5F, such that on removal of the side panel 26, the upper edge of the side panel 26 or the upper retaining strip extends substantially parallel to this section 56. The section 56 could, however, also be configured in another way, to be curved. The upper, second rail 32 must only be configured such that tilting about the stop 46 or lifting of the front edge 27 of the side panel 26 is prevented, whilst lifting of the rear edge 29 or tilting about the first support point 38 in the open position is possible. Since the side panel 26 can be tilted about the stop 46 or about the projection 44, it must be ensured that the front, upper corner of the side panel 26 makes contact with the second rail 32. Since, when the side panel is tilted, this corner moves essentially along a circular path about the stop 46 or the projection 44, in order reliably to prevent tilting of the side panel 26, the second section 56 must be arranged within a circular path about the stop 46 or about the projection 44

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A mounting for a side panel of a weighing machine, comprising:
    a first rail and a second rail opposite the first rail, wherein the rails extend substantially in parallel to one another, and are configured to guide the side panel when the side panel is displaced between a closed position and an open position, and
    a stop provided at the first rail and configured to cooperate with the side panel such that the open position is defined by the stop and the second rail lies opposing the first rail at such a spacing that:
        the side panel, when located in the open position is movable beyond the stop when a rear edge of the side panel is lifted in the first rail during opening of the side panel, and
        a front edge opposing the rear edge of the side panel is at least substantially prevented from lifting in the first rail during the opening of the side panel.

2. The mounting as claimed in claim 1, further comprising a closing mechanism which fixes the side panel in the closed position.

3. The mounting as claimed in claim 2, wherein the closing mechanism operates to displace the side panel into the closed position based on a change of mechanical potential.

4. The mounting as claimed in claim 3, wherein the closing mechanism has at least one section on one of the rails extending inclined.

5. The mounting as claimed in claim 4, wherein the inclined section lies at a front end of the one rail with respect to a closing direction of the side panel.

6. The mounting as claimed in claim 5, further comprising a further inclined section on a rear end of the one rail with respect to the closing direction of the side panel.

7. The mounting as claimed in claim 5, wherein the rail comprises a dead point.

8. The mounting as claimed in claim 1, wherein:
    the second rail extends, from a point opposing the stop against a closing direction, away from the first rail within a circular arc, a center point of the arc corresponds to the stop or to a further projection on the mounting, and
    a radius of the arc corresponds to a distance from the center point to a front, upper corner of the side panel.

9. The mounting as claimed in claim 1, wherein at least one of the first rail and the second rail is formed by a groove.

10. The mounting as claimed in claim 9, wherein the stop is formed by a narrowing of the groove.

11. The mounting as claimed in claim 1, wherein the rails are configured open at ends thereof opposing a closing direction of the side panel.

12. The mounting as claimed in claim 1, further comprising a retaining strip in each of the rails, wherein the retaining strips are mounted displaceably in the respective rails in a closing direction of the side panel, and wherein the side panel is mounted on the retaining strips.

13. The mounting as claimed in claim 12, wherein the retaining strips mounted in the first rail further comprise projections.

14. The mounting as claimed in claim 13, wherein the projections are arranged in the closing direction behind a center of gravity axis of the side panel.

15. The mounting as claimed in claim 13, wherein the respective retaining strips guided in the first rail each have three support points, wherein a first support point is disposed at a front end of the retaining strip in the closing direction, a second support point is disposed at a rear end of the retaining strip in the closing direction and a third support point is disposed in a region of the projection, wherein the third support point is provided behind the projection in the closing direction.

16. The mounting as claimed in claim 15, wherein at least one of the first, second and third support point comprises a roller.

17. The mounting as claimed in claim 15, wherein at least one of the first, second and third support point comprises a skid.

18. The mounting as claimed in claim 15, wherein the third support point is set back on the retaining strip relative to the first and second support points in a direction toward the first rail.

19. The mounting as claimed in claim 12, further comprising a handle at a front end of the retaining strip.

20. An assembly for a windshield for the weighing machine comprising the mounting as claimed in claim 1 and the side panel configured to mount displaceably in the rails with respect to a closing direction of the side panel.

21. A method for removing the side panel from the assembly as claimed in claim 20 comprising:
  displacing the side panel in opposition to a closing direction of the side panel until a projection associated with the side panel lies against the stop of the first rail,
  lifting the rear edge of the side panel until the projection no longer lies against the stop, wherein the side panel is pivoted about a front support point,
  displacing the side panel in opposition to the closing direction until the side panel is completely pushed out of the mounting.

* * * * *